3,539,682
X-RAY CONTRAST MEDIUM CONTAINING BARIUM SULPHATE
Sven Axell Eriksson, Sodertalje, Sweden, assignor to Aktiebolaget Astra, Sodertalje, Sweden, a company of Sweden
No Drawing. Continuation-in-part of application Ser. No. 589,810, Oct. 27, 1966. This application June 23, 1967, Ser. No. 648,214
Int. Cl. A61k 27/08
U.S. Cl. 424—4           7 Claims

ABSTRACT OF THE DISCLOSURE

This invention relates to X-ray contrast compositions stable in acidic media containing barium sulphate and intimately mixed therewith a protective colloid capable of producing a thixotropic gel, said protective colloid consisting essentially of an acid-resistant water-soluble material of the group consisting of (1) certain types of carragheenans, which are galactans partially esterified and which are isolated from red algae and (2) alginic acid partially esterified with propylene glycol.

---

This application is a continuation-in-part of my copending application Ser. No. 589,810, filed Oct. 27, 1966, now abandoned, which in turn is a continuation-in-part of Ser. No. 183,056, filed Mar. 28, 1962, now abandoned. The application is also related by copendency to copending application Ser. No. 584,005, filed Oct. 3, 1966, now abandoned.

Barium sulphate is widely used in roentgenography and roentgenoscopy, particularly of cavities of the body and more particularly of the intestinal tract. Barium sulphate is an excellent contrast medium but to a great extent due to its very high density, it is very difficult to obtain a composition that will comply with all that is required of a good contrast composition.

Objects of the invention are to obtain improved properties of an X-ray contrast composition in respect of high capacity for adhering to the walls of the body cavities and being uniformly distributed upon the mucous membranes. A further object is to obtain an X-ray contrast composition in the form of a suspension that can be stored without segregation or sedimentation of the barium sulphate for a longer time than is possible with contrast compositions hitherto known. A still further object is to obtain an X-ray contrast composition that is highly stable even in an acidic medium and is well compatible and miscible with digestive liquids and does not interfere with the normal peristaltic activity of the intestines. Another object is to obtain a contrast composition having thixotropic properties and a further object is to obtain a contrast composition that can be diluted from a powder or a comparatively concentrated state suitable for storage and dispatch, up to any dilution desired for roentgenologic purposes, e.g. up to ten times its original volume, without segregation of the suspension.

These objects and other advantages of the invention will be obtained in one embodiment of the invention by mixing barium sulphate with a protective colloid which consists mainly of certain types of carragheenans.

Several different protective colloids have been tried together with barium sulphate in X-ray contrast media. Examples of such colloids are: Gum Arabic, pectin, sodium alginate and the sodium salt of carboxymethylcellulose. Such compositions, however, have been found not to be stable in acidic media such as gastric juice. It has been pointed out by Whistler (Industrial Gums (1959), page 93) that carragheenans contain two components, kappa and lambda, and that "gelation behavior is attributable primarily to the kappa component." In this invention I have found that the carragheenans which have been found useful for the preparation of thixotropic acid-resistant gels should contain at least 80% of lambda fraction. Such carragheenans are built up from galactose units which are partly esterified with sulphuric acid. In general, the amount of sulphuric acid ester groups is 0.07–1 mole per galactose unit. However, all such fractions are not useful, but only those having an intrinsic viscosity of not less than about 4 (100 ml./g.) and not higher than about 10 (100 ml./g.) as shown in Example 3. The manner of determination of the intrinsic viscosity is found in Example 3, (following Table 2).

In another embodiment of the invention, barium sulphate is mixed with alginic acid partially esterified with propylene glycol, as the protective colloid. It is important for purposes of the invention that a number of the carboxylic groups remain free, i.e. unesterified by the glycol.

Alkylene glycol esters of alginic acids have been shown by Steiner (U.S. Pats. 2,426,125, 2,494,911 and 2,494,912) to be useful emulsion stabilizers. However, I have found that many such esters form gels which are not stable in acidic media. The type of alginic acid varies with the source from which it has been isolated. Those alginic acids, which contain more than 50% mannuronic acid and not more than 50% guluronic acid, have been found to be preferred as starting material in the esterification with propylene glycol to give a protective colloid which forms thixotropic gels which are stable in acidic media, e.g. the gastric juice. Furthermore, the percentage of carboxyl groups of the alginic acid esterified with propylene glycol must be at least about 70% and preferably more than about 80% to obtain maximum stability in acidic media.

The protective colloids according to the invention are water-soluble and stable in moderately acid media, e.g. in the gastric juice. For obtaining a good radiopacity the barium sulphate should consist of rounded separated particles of even size below the $5\mu$, preferably of the size of about $1\mu$. The proportion of the protective colloids relative to the contrast agent is with advantage 0.1–4%, preferably 0.5–1.5%.

The compositions may, of course, contain conventional preservatives, such as a salt of citric acid, and flavoring agents as well as, if desired, a suitable dispersing agent, such as polyalkylarylsulphonate.

The X-ray contrast composition according to the invention can be obtained either as a dry preparation or as a suspension.

It has been found, that the protective colloid according to the invention together with barium sulphate and water renders a stable, thixotropic suspension that can be diluted according to the demands up to 10 times its volume without sedimentation. The shelf life of the suspension is improved by the addition of preservatives and may, if desired, be further improved by pasteurizing. Of course, the preparing of a dispersion of a dry preparation requires time-consuming work and, in addition, must be carried out with the greatest care (since otherwise inhomogeneous suspensions are easily obtained or air bubbles may be formed in the preparation which may lead to serious diagnostic misinterpretation). It is, therefore, time-saving as well as safer for the consumer to use a suspension which, in view of its excellent stability, can directly be dispensed and distributed in suitable one purpose packaging.

The invention will be more completely explained with reference to the following examples:

EXAMPLE 1

The following composition was prepared.

|  | Kg. |
|---|---|
| Barium sulphate paste (containing about 30% $H_2O$) | 80 |
| Carragheenan comprising 95% lambda carragheenan having an intrinsic viscosity of 3.75 (this is a galactan partially esterified with sulphuric acid and which is isolated from red algae) | 0.8 |
| Sodium polyalkylarylsulphonate | 0.1 |
| Sorbic acid | 0.02 |
| Citric acid to pH 4. | |
| Flavor (sodium cyclamate, etheric oil), q.s. | |
| Water, ad 100 l. | |

The citric acid, sorbic acid and flavoring agents are dissolved in about 15 liters of water. The carragheenan is added to this solution and is thereby preserved by the acids. The barium sulphate paste is worked up with the sodium polyalkylarylsulphonate in a mixer to even consistency, and the carragheenan solution is then worked up into the mixture. The suspension obtained is diluted with water up to 100 liters and is then pasteurized at about 70° C. and homogenized in a colloid mill.

This suspension has a shelf life of at least one year at +20° C. Even if an insignificant sedimentation could be observed in the surface layers after storage for some longer time the suspension is easily homogenized on account of its thixotropic properties, for instance, by a very slight stirring. This product can be diluted up to 10 times its volume with water without segregation of the suspension even after storage for a considerable time.

The suspension may in conventional manner be transformed into a dry preparation as by spray-drying or roll or drum drying. A suspension made from such a dry preparation has in general an equally good storing capacity as the original suspension and may likewise be diluted with water without sedimentation.

The use of the suspension prepared according to this example will be illustrated by the following table showing a dilution schedule for obtaining suitable densities for different uses, the required amount of water being added to the suspension with stirring.

| Volumes of dilution water per volume of suspension: | Compositions suitable for the roentgenography of— |
|---|---|
| 0 | Esophagus. |
| 0.5–2 | Gastrointestinal examinations. |
| 3–8 | Colon. |

In this manner it is thus possible by a simple dilution of the suspension to obtain a density of the contrast agent suitable for the current purpose.

EXAMPLE 2

|  | Kg. |
|---|---|
| Barium sulphate paste (containing about 30% $H_2O$) | 40 |
| Carragheenan according to Example 1 | 1 |
| Sodium polyalkylarylsulphonate | 0.1 |
| Sorbic acid | 0.06 |
| Citric acid, ad pH 4. | |
| Water, ad 100 l. | |

The ingredients are mixed as in Example 1. The product obtained is suitable for colon investigation.

EXAMPLE 3

The stability from sedimentation of X-ray contrast compositions containing barium sulphate and different protective colloids was examined as described below:

4.8 g. of the protective colloid was mixed with a solution consisting of 0.4 g. of citric acid and 0.4 g. of potassium sorbate in 200 ml. of distilled water and 24 hours later it was mixed with 750 g. of a barium sulphate paste containing 30% water and 0.9 g. of sodium polyalkylarylsulphonate and diluted to 1000 g. 100 ml. of the preparation were diluted with 100 ml. of water while stirring. The preparation was then made acidic by the addition of 1 ml. of 5 N hydrochloric acid. The suspension was then poured into a glass cylinder (25 mm. in diameter and about 200 mm. of height) to a height of 170 mm. After 24 hours the height of the clear solution above the suspension was measured, which height hence gives the sedimentation tendency of the preparation.

As is shown in Table 1, a considerable sedimentation was observed already after 24 hours in suspensions containing a known protective colloid, but in the cases with protective colloid according to the invention the suspension could be stored for months under identical conditions without any sedimentation.

In Table 2 is shown the lambda and kappa content and the intrinsic viscosity of the lambda fractions of the carragheenan types 1–6 given in Table 1.

TABLE 1

| Protective colloid: | Sedimentation in acidic medium, mm. |
|---|---|
| Carragheenan type 1 | 0 |
| Carragheenan type 2 | 0 |
| Carragheenan type 3 | 0 |
| Carragheenan type 4 | 9 |
| Carragheenan type 5 | 40 |
| Carragheenan type 6 | 55 |
| Gum arabic | 73 |
| Dextrin | 70 |
| Tragacantha | 65 |
| Gelatin | 35 |
| Agar-agar | 28 |
| Pectin | 7 |
| Carboxymethyldextran, sodium salt | 56 |
| Sodium alginate | 41 |
| Polyacrylic acid | 34 |
| Tween 80 | 50 |
| Carboxymethylcellulose, sodium salt (sediments) | 10 |

TABLE 2

| Carragheenan type | Percent kappa fraction | Percent lambda fraction | Percent residue | Intrinsic viscosity of the lambda fraction, 100 ml./g. |
|---|---|---|---|---|
| 1 | 5 | 95 | 0 | 3.75 |
| 2 | 4 | 85 | 11 | 7.00 |
| 3 | 0 | 100 | 0 | 7.00 |
| 4 | 0 | 80 | 20 | 0.68 |
| 5 | 58 | 21 | 21 | 2.26 |
| 6 | 74 | 19 | 7 | 8.3 |

For the determinations of the viscosity a 1/30 molar sodium phosphate buffer with a pH of 6.60 has been used. Furthermore, the buffer had a sodium chloride content of 0.1 mole per liter. The measurements were carried out in a viscosimeter of the Ostwald type and at a temperature of 25° C. The intrinsic viscosity was determined by extrapolation to the concentration (c) zero of the reduced viscosity, $\eta_c^{sp}$, which viscosity was determined at five or six concentrations.

The determination of the percentage of kappa- and lambda-fractions in the carragheenans was carried out as follows:

2 g. of carragheenan were dissolved while stirring in 1 l. of water at a temperature of 60° C. during 30 minutes, whereafter the solution was left standing at room temperature overnight. When 333 ml. of 1-C KCl had been added while stirring, the solution was again left standing overnight. The precipitation formed was separated from the solution by centrifugation. The precipitate which consists of kappa carragheenan, was dissolved in water and was reprecipitated by the addition of three times its volume of $C_2H_5OH$. The clear solution from the centrifugation contains the lambda carragheenan. This solution was also treated with three times its volume of $C_2H_5OH$. In this way the lambda carragheenan was precipitated. When the two precipitates had been in contact with their solutions overnight, the precipitates were separated by centrifugation. The sediments were dissolved in water and freeze dried. The amounts of kappa- and lambda-carragheenan were determined by weighing to a constant weight after storage in a vacuum exsiccator.

EXAMPLE 4

|  | Kg. |
|---|---|
| Barium sulphate paste (containing about 30% $H_2O$) | 80 |
| Algae extract consisting of galactane from red algae | 0.8 |
| Sodium polyalkylarylsulphonate | 0.1 |
| Sorbic acid | 0.02 |
| Citric acid to pH 4. | |
| Flavor (sodium cyclamate, etheric oil) q.s. | |
| Water, ad 100 l. | |

The citric acid, sorbic acid and flavoring agents are dissolved in about 15 liters of water. The algae extract is added to this solution and is thereby preserved by the acids. The barium sulphate paste is worked up with the sodium polyalkylarylsulphonate in a mixer to even consistency, and the algae extract solution is then worked up into the mixture. The suspension obtained is diluted with water up to 100 liters and is then pasteurized at about 70° C. and homogenized in a colloid mill.

This suspension has a shelf life of at least one year at +20° C. Even if an insignificant sedimentation could be observed in the surface layers after storage for some longer time the suspension is easily homogenized on account of its thixotropic properties, for instance by a very slight stirring. This product can be diluted up to 20 times its volume with water without segregation of the suspension even after storage for a considerable time.

EXAMPLE 5

|  | Kg. |
|---|---|
| Barium sulphate paste (containing about 30% $H_2O$) | 40 |
| Algae extract according to Example 4 | 1 |
| Sorbic acid | 0.06 |
| Citric acid ad pH 4. | |
| Water, ad 100 l. | |

The ingredients are mixed as in Example 4. The product obtained is suitable for colon investigation.

The following examples illustrate the use of the propylene glycol esters of alginic acid.

EXAMPLE 6

The following composition was prepared:

|  | Kg. |
|---|---|
| Barium sulphate | 60 |
| Propylene glycol ester of alginic acid (degree of esterification 50%) | 1 |
| Sorbic acid | 0.02 |
| Citric acid | 0.04 |
| Flavoring agent (sodium saccharate, etheric oil) q.s. | |
| Water, ad 100 l. | |

The ingredients are mixed according to Example 1. The product obtained is suitable for esophageal examination.

EXAMPLE 7

|  | Kg. |
|---|---|
| Barium sulphate paste (containing about 30% $H_2O$) | 60 |
| Propyleneglycolester of alginic acid (degree of esterification about 80%) | 1 |
| Sodium polyalkylarylsulphonate | 0.1 |
| Sorbic acid | 0.02 |
| Citric acid | 0.04 |
| Flavoring agent (sodium saccharate, etheric oil) q.s. | |
| Water, ad 100 l. | |

The citric acid, sorbic acid and flavoring agents are dissolved in about 15 liters of water. The alginate is added to this solution and is thereby preserved by the acids. The barium sulphate paste and the sulphonate is worked up with the ester solution. The suspension obtained is diluted with water to 100 liters and is then pasteurized at about 70° C. and homogenized in a colloid mill.

This suspension has a shelf life of at least one year at +20° C. Even if an insignificant sedimentation could be observed in the surface layers after storage for some longer time, the suspension is easily homogenized on account of its thixotropic properties, for instance by a very slight stirring.

The product obtained in this example is suitable for esophageal examination but may be diluted if desired. Thus, the product may be diluted up to 10 times its volume with the water, without segregation of the suspension even after storage for a considerable time.

The use of the suspension prepared according to this example will be illustrated by the following table showing a dilution schedule for obtaining suitable densities for different uses, the required amount of water being added to the suspension under stirring.

| Volumes of dilution water per volume of suspension: | Compositions suitable for the roentgenography of— |
|---|---|
| 0 | Esophagus. |
| 0.5–2 | Gastrointestinal examinations. |
| 3–8 | Colon. |

In this manner it is thus possible by a simple dilution of the suspension to obtain a density of the contrast agent suitable for the current purpose.

EXAMPLE 8

The stability from sedimentation of X-ray contrast compositions containing barium sulphate and different protective colloids was examined as described below:

4.8 g. of the protective colloid was mixed with a preservative consisting of 0.4 g. of citric acid and 0.4 g. of potassium sulphate and 24 hours later it was mixed with a barium sulphate paste containing 30% water. 100 ml. of the preparation were diluted with 100 ml. of water while stirring. The preparation was then made acidic by the addition of 1 ml. of 5 N hydrochloric acid. The suspension was then poured into a glass cylinder (25 mm. in diameter and about 200 mm. of height) to a height of 170 mm. After 24 hours the height of the clear solution above the suspension was measured, which height hence gives the sedimentation tendency of the preparation.

As is shown in Table 3 a considerable sedimentation was observed already after 24 hours in suspensions containing a known protective colloid but in the cases with protective colloid according to the invention the suspension could be stored for months under identical conditions without any sedimentation.

In Table 4 is shown the mannuronic and guluronic acid content as well as the degree of esterification of the alginate types 1–4 given in Table 3.

TABLE 3

| Protective colloid: | Sedimentation in acidic medium |
|---|---|
| Alginate type 1 | 28 |
| Alginate type 2 | 30 |
| Alginate type 3 | 24 |
| Alginate type 4 | 0 |
| Gum arabic | 73 |
| Dextrin | 70 |
| Tragacantha | 65 |
| Gelatin | 35 |
| Agar-agar | 28 |
| Pectin | 7 |
| Carboxymethyldextran, sodium salt | 56 |
| Sodium alginate | 41 |
| Polyacrylic acid | 34 |
| Tween 80 | 50 |
| Carboxymethylcellulose, sodium salt (sediments) | 10 |

TABLE 4

| Alginate type | Percentages | | |
|---|---|---|---|
| | Mannuronic acid | Guluronic acid | Degree of esterification |
| 1 | >50 | <50 | 60 |
| 2 | >50 | <50 | 60 |
| 3 | <50 | >50 | 60 |
| 4 | >50 | <50 | 80 |

The degree of esterification is given as the percentage of carboxyl groups of the alginic acid esterified with propylene glycol.

I claim:
1. A thixotropic X-ray contrast composition stable in acidic media containing barium sulphate and intimately mixed therewith a protective colloid capable of producing a thixotropic gel, said protective colloid consisting essentially of an acid-resistant water-soluble material of the group consisting of (1) a carragheenan containing at least about 80% of the lambda fraction, said fraction having an intrinsic viscosity of not less than 3.75 (100 ml./g.) and not more than about 10; and (2) a propylene glycol ester of alginic acid, containing more than 50% mannuronic acid, partially esterified with propylene glycol, with a degree of esterification of at least about 80% calculated as the percentage of caboxyl groups of the alginic acid esterified with propylene glycol.

2. A thixotropic X-ray contrast composition according to claim 1 containing the protective colloid in an amount in the range of 0.1–4% calculated on the weight of the barium sulphate.

3. A thixotropic X-ray contrast composition according to claim 1 in the form of a dry preparation.

4. An X-ray contrast composition according to claim 1 in which the protective colloid is a carragheenan containing at least about 80% of the lambda fraction, said fraction having an intrinsic viscosity of not less than 3.75 (100 ml./g.) and not more than about 10.

5. An X-ray contrast composition according to claim 4 in which the amount of sulfuric acid ester groups is 0.07–1 mole per galactose unit.

6. An X-ray contrast composition according to claim 1 in which the protective colloid is said propylene glycol ester of alginic acid.

7. An X-ray contrast composition according to claim 1 containing the protective colloid in an amount in the range of 0.5 to 1.5%.

References Cited

UNITED STATES PATENTS 3,236,735    2/1966    Brown _____ 424—4

ALBERT T. MEYERS, Primary Examiner

N. A. DREZIN, Assistant Examiner